United States Patent
Rusman et al.

(10) Patent No.: US 7,805,753 B2
(45) Date of Patent: Sep. 28, 2010

(54) SYSTEM AND METHOD FOR OPTICAL MEDIUM REGION PROTECTION

(75) Inventors: Mujianto Rusman, Round Rock, TX (US); George D. Kokkosoulis, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1042 days.

(21) Appl. No.: 11/533,393

(22) Filed: Sep. 20, 2006

(65) Prior Publication Data

US 2008/0127353 A1    May 29, 2008

(51) Int. Cl.
G06F 17/00 (2006.01)
G06F 7/04 (2006.01)
G06F 17/30 (2006.01)
H04L 29/06 (2006.01)
B41K 3/38 (2006.01)
H04N 7/167 (2006.01)

(52) U.S. Cl. .................. 726/1; 726/2; 380/59; 380/201

(58) Field of Classification Search .................. 380/59, 380/201; 726/1, 2
See application file for complete search history.

(56) References Cited

U.S. PATENT DOCUMENTS

| | | | |
|---|---|---|---|
| 6,738,876 B2 * | 5/2004 | La | 711/163 |
| 6,788,632 B2 * | 9/2004 | Huang et al. | 369/53.21 |
| 2001/0029568 A1 * | 10/2001 | La | 711/112 |
| 2002/0172082 A1 * | 11/2002 | Huang et al. | 365/200 |
| 2004/0127231 A1 | 7/2004 | Dor et al. | 455/456.6 |
| 2005/0055574 A1 | 3/2005 | Chmaytelli | 713/201 |

* cited by examiner

*Primary Examiner*—Farid Homayounmehr
*Assistant Examiner*—Benjamin A Kaplan
(74) *Attorney, Agent, or Firm*—Hamilton & Terrile, LLP; Robert W. Holland

(57) ABSTRACT

Restrictions on optical drive code changes, such as a predetermined number of region code changes for playing optical media with varying region codes, are enforced with an application solution. Each request to perform a region code change is authorized by retrieving a certificate to verify that a code change is permitted, decrementing the number of remaining authorized code changes reflected by the certificate, and storing the updated certificate for use at a subsequent code change request. The certificate is generated by application of one or more unique identifiers and encrypted during storage for security.

15 Claims, 3 Drawing Sheets

SYSTEM AND METHOD FOR OPTICAL MEDIUM REGION PROTECTION

BACKGROUND OF THE INVENTION

1. Field of the Invention

The present invention relates in general to the field of information handling system optical media, and more particularly to a system and method for optical medium region protection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include optical storage drives that read information from and write information to optical media. Optical media provide inexpensive and easy-to-use storage for relatively large quantities of information and are thus commonly used to store multimedia information, such as music and movies. For example, Compact Discs (CDs) use an infrared laser to store approximately 750 MB of information, a convenient size for musical albums, and Digital Versatile Discs (DVD) use a red laser to store approximately 4 GB of information, a convenient size for movies that use MPEGII compression with 480 p resolution. Recently, optical storage drives have been introduced that use a blue laser to store as much as 30 GB of information under the Blu-ray Disc (BD) or High Definition DVD (HD-DVD) standards. Optical storage drives are sold as stand-alone player systems with basic information handling system components that play movies and music for entertainment devices. Optical storage drives are also commonly incorporated in desktop and portable information handling systems so that the systems not only support presentation of entertainment information but also support storage and use of other types of information, such as documents, spreadsheets and presentations. For instance, business travelers with portable information handling systems have both a portable office to work on the road but also a portable entertainment device to watch movies and listen to music after the workday.

One difficulty associated with the convenience of optical media is that intellectual property owners face greater challenges in protecting their rights to entertainment content. For example, content owners, such as movie studios, sometimes impose region controls over content, such as theatrical movie titles, with release schedules varying by geographic areas based on regional business strategies. To manage geographical release strategies, the BD standard defines region codes that are included in the optical media and stand-alone optical drive player systems. Unless the region code stored on an optical medium matches the region code of a player, content playback is prohibited. Since home entertainment devices are typically designed for sale in a particular region, a hardware or firmware solution fixes the region code to prevent user alterations. However, portable information handling systems are often used during travel so an end user might have a legitimate reason to use optical media from more than one region. DVD optical drives have an internal non-volatile read/write buffer and a user interface that allow an end user to change the region code up to five times. The Blu-ray standard also allows up to five region changes, however Blu-ray optical drives for use in information handling systems do not have integrated hardware logic to manage region code changes. Software solutions run by an application on the optical drive or information handling system can limit region code changes, however, software solutions are somewhat easier to hack, such as by reinstallation of the application that manages the number of region code changes.

SUMMARY OF THE INVENTION

Therefore a need has arisen for a system and method which securely manages optical drive code changes with a software solution.

In accordance with the present invention, a system and method are provided which substantially reduce the disadvantages and problems associated with previous methods and systems for managing optical drive codes. A certificate generated at an information handling system from one or more unique identifiers and a counter manages authorization for code changes at an optical drive.

More specifically, an optical drive code change manager operating in an application layer of an information handling system automatically generates and updates a certificate to track authorization for the optical drive to perform a region protection code change. At insertion of an optical medium into an optical drive, the region code of the medium is compared against the region code of the optical drive with content available only if the region codes match. If the region codes do not match, the optical drive requests a region code change authorization from the code change manager in order to play the content. The region code manager retrieves a certificate from a hidden file, extracts unique identifiers and a counter value from the certificate, and compares the extracted unique identifiers with unique identifiers retrieved from the information handling system. If the extracted and retrieved unique identifiers do not match or the counter value is zero, the requested code change is denied. If the unique identifiers match and the counter has a value of at least one, the code change is authorized, the counter is decremented, and the certificate is regenerated with the unique identifiers and the updated counter value. The certificate is then encrypted and stored in a hidden file and the content is accessed by the optical drive with the updated region code matching the optical medium region code.

The present invention provides a number of important technical advantages. One example of an important technical advantage is that an information handling system optical drive has region code changes managed in a secure manner by a software-based application. Optical drive region code changes made to present content from an optical medium having a different region code are made automatically in a manner transparent to the end user as long as the optical drive has authorized code changes remaining. Once a predetermined number of region code changes are completed at the optical drive, further region code change requests are automatically refused. By tying authorization for region code changes to unique identifiers of the information handling system, a unique and verifiable certificate is generated for each information handling system. Together with encryption and storage in a hidden file, the certificate provides substantial security against illicit changes to the region code of an optical drive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element. Creation of a certificate of authority based on system-unique features reduces the risk of avoidance of region code restrictions by a generalized hacker work around or avoidance by system resets, such as re-imaging of a system hard disk drive. Automated tracking and changing of region codes avoids end user confusion introduced by manual updates.

DETAILED DESCRIPTION

Generating a certificate to manage optical drive code changes for an information handling system optical drive provides a flexible yet secure solution by tying the certificate to unique identifiers of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
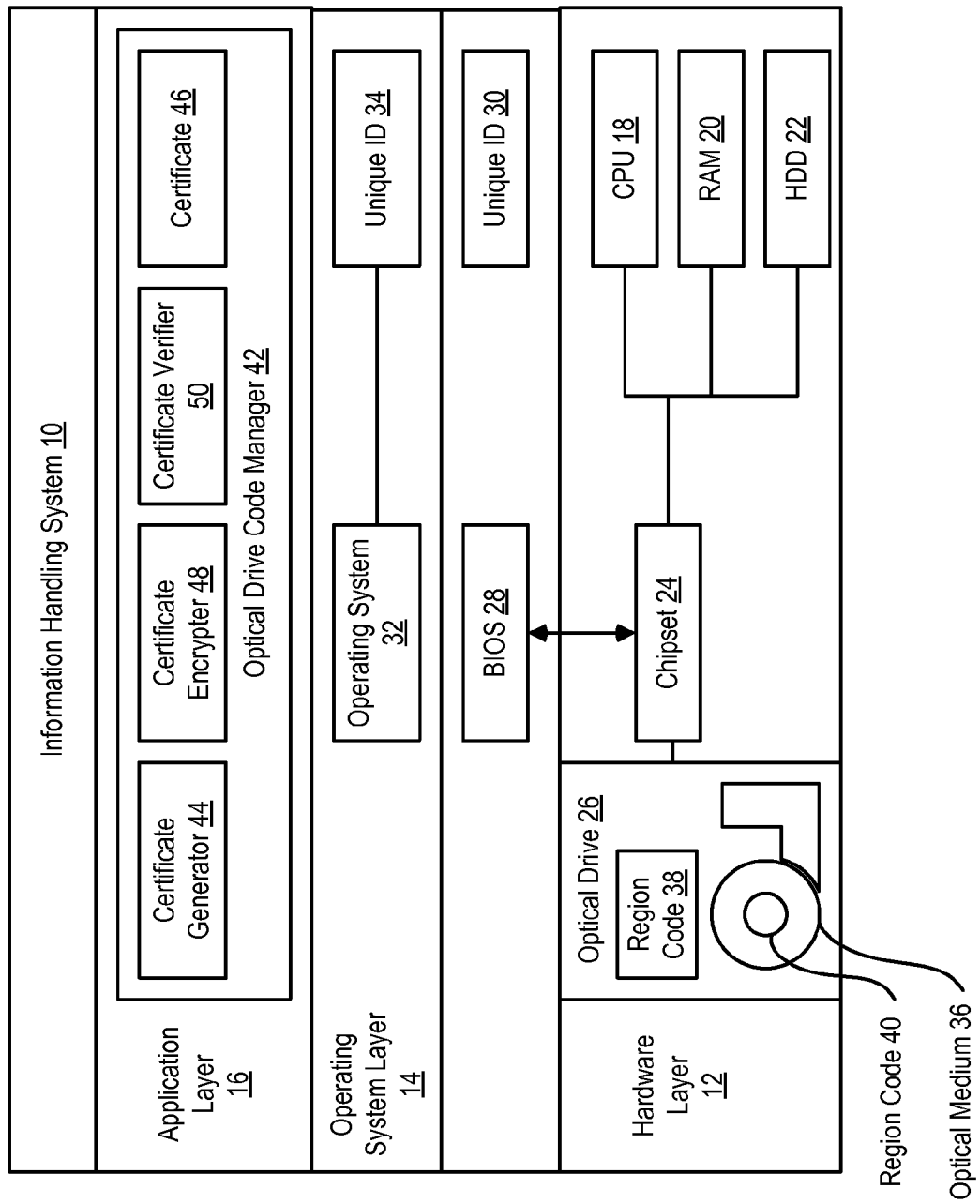
FIG. 1 depicts a block diagram of an information handling system that enforces restrictions for optical drive code changes.

Referring now to FIG. 1, a block diagram depicts an information handling system 10 that enforces restrictions for optical drive code changes. Information handling system 10 has a hardware layer 12 having plural processing components, an operating system layer 14 that manages operation of the processing components and an application layer 16 that runs applications on hardware layer 12 coordinated by operating system layer 14. The processing components of hardware layer 12 include a CPU 18, RAM 20, a hard disk drive 22, a chipset 24 and an optical drive 26. Chipset 24 supports firmware that include permanent storage, such as a BIOS 28, which stores code to initiate boot and information to support maintenance, such as a service tag or other unique identifier 30 for information handling system 10. Operating system layer 14 includes an operating system 32, such as WINDOWS or LINUX, which coordinates operation of the hardware components. Operating system 32 stores a unique identifier 34, such as a security code or key to prevent unauthorized copying or use of the operating system. Applications on application layer 16 include a variety of software programs that run on the hardware components, such as a player application that plays audiovisual information from an optical medium 36 inserted in optical drive 26.

Optical drive 26 includes a region code setting 38 that defines a restriction on the play of optical media having an embedded region code 40 that differs from the region code setting 38. For example, an optical medium having content released only in the United States will have a region code 40 that restricts play of the content by an optical drive having a region code setting 38 of other than the United States. However, to support the use of optical drives in portable information handling systems, optical drive 26 is permitted to change the region code up to five times. In the above example, the region code setting 38 of optical drive 26 is allowed to change to the United States region code to play optical medium 36 as long as the region code has not previously change five or more times. Once optical drive 26 has performed five region code setting 38 changes, no further changes to region code setting 38 are permitted.

Changes to region code setting 38 are managed with an optical drive code manager 42 running in application layer 16. A certificate generator 44 generates a certificate 46 to define the number of allowed region code changes for optical drive 26 by tying certificate 46 to information handling system 10 with unique identifiers for system 10, such as the unique identifier 30 associated with one or more hardware components or unique identifier 34 associated with operating system 32. Certificate generator 44 also incorporates the number of remaining authorized code changes with the remaining authorized code changes decremented at each code change until no more code changes are authorized. A certificate encrypter encrypts the certificate with a random activation key and then stores the certificate in a hidden file on the information handling system, such as in hard disk drive 22 or ROM associated with BIOS 28 or optical drive 26. At the next detection of an incompatible region code by optical drive 26 with an optical medium 36, a certificate verifier 50 retrieves certificate 46 to verify whether another region code change is authorized for optical drive 26. Certificate verifier 50 decrypts the certificate to extract the unique identifiers and number of authorized region code changes that remain. The number of authorized changes is verified by comparing the unique identifiers extracted from the certificate with unique values retrieved from information handling system 10. If remaining number authorized region code changes are verified, the code change is authorized and optical drive 26 reads optical medium 36 with the updated region code. If the remaining number of authorized region code changes is not verified or is zero, then optical drive 26 does not change region codes and the attempt to read optical medium 36 fails.

Figure 2:
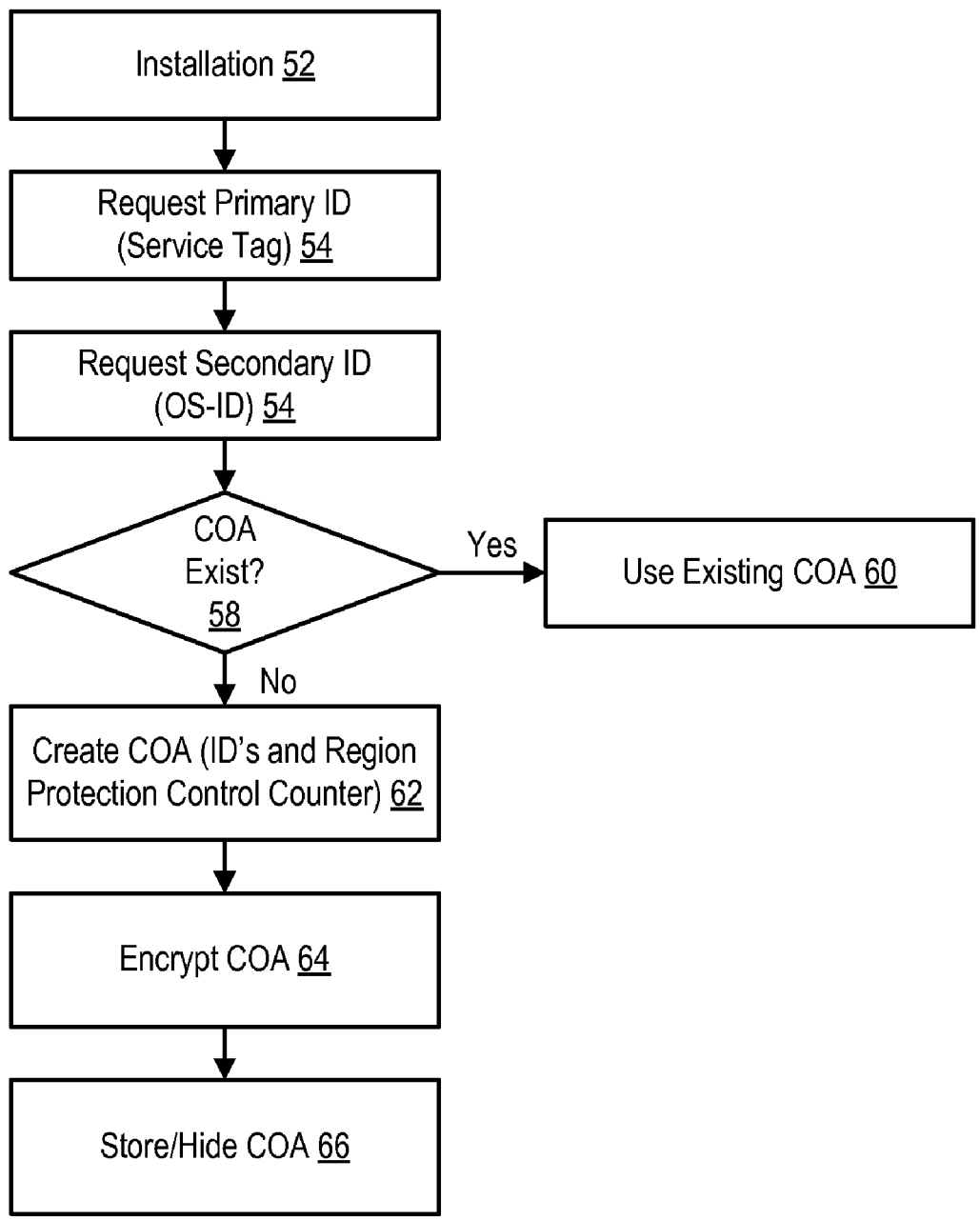
FIG. 2 depicts a flow diagram of a process for defining a certificate to restrict optical drive region code changes.

Referring now to FIG. 2, a flow diagram depicts a process for defining a certificate to restrict optical drive region code changes. The process begins at step 52 with installation of an optical drive code manager on an information handling system. At step 54, the code manager retrieves a primary unique identifier from the information handling system, such as a service tag stored in the BIOS. At step 56, the code manager retrieves a secondary unique identifier, such as an operating system key. At step 58, a determination is made of whether a certificate of authenticity exists for the optical drive. If so, at step 60, the existing certificate is used so that any prior region code changes are counted; this prevents an end user from resetting the certificate by reinstallation of the code manager application. If no certificate exists, the process continues to step 62 to create a certificate from the unique identifiers and the allowed changes kept by a region protection code counter. At step 64, the certificate is encrypted with a random activation key. At step 66, the encrypted certificate is stored in a hidden file, such as a file with unique extension. Encrypting and storing the certificate in a hidden file makes illicit changes to the certificate difficult to make.

Figure 3:
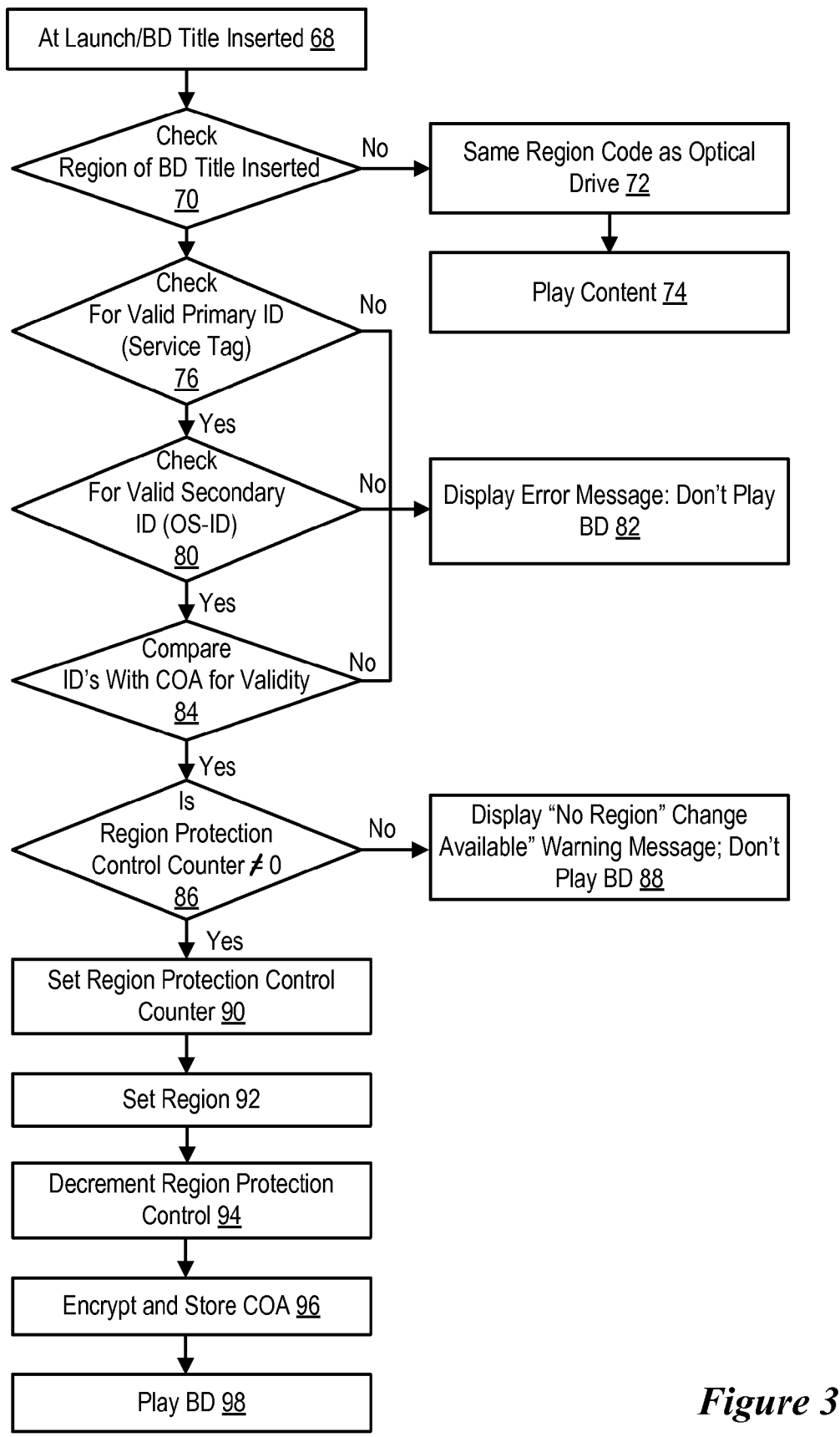
FIG. 3 depicts a flow diagram of a process for applying a certificate to authorize or deny an optical drive region code change request.

Referring now to FIG. 3, a flow diagram depicts a process for applying a certificate to authorize or deny an optical drive region code change request. The process begins at step 68 with insertion and launch of a region code protected optical medium into the optical drive, such as a BD optical medium. At step 70, the region code of the optical medium is checked against the region code setting of the optical drive, and if the region codes match at step 72 the optical drive is provided access to play the content of the optical medium at step 74. If at step 70 the optical medium and optical drive region codes do not match, the process continues to step 76 to retrieve the primary unique identifier from the information handling system and to step 78 to retrieve the secondary identifier from the operating system. If either unique identifier is invalid, the process continues to step 82 to display an error message that the optical medium content cannot be displayed since the optical drive is not associated with the correct information handling system. If both unique identifiers are valid, the process continues to step 84 to compare these retrieved unique identifiers with the unique identifiers extracted from the certificate of authority. A failure to match the unique identifiers retrieved from the system and the unique identifiers extracted from the certificate results in display of the error message and denial of authority to play the content at step 82.

If the unique identifiers match at step 84, the process continues to step 86 to determine if one or more region protection code changes are authorized. If a region protection code change is not authorized, the process continues to step 88 to present a warning to the end user that a region code change is not authorized. If one or more region protection code changes remain, the process continues to step 90 to set the region protection code counter at the current value extracted from the certificate and to step 92 to set the region code of the optical drive to the region code of the optical medium. At step 94, the region protection code counter is decremented to reflect the code change and, at step 96, a new certificate is generated and encrypted to reflect the unique identifiers and the new region protection code counter value. At step 98, the content of the optical medium is played by the optical drive using the updated region protection code.

Although the present invention has been described in detail, it should be understood that various changes, substitutions and alterations can be made hereto without departing from the spirit and scope of the invention as defined by the appended claims.

What is claimed is:

1. An information handling system comprising:
   a hardware layer having at least a CPU configured to process information and an optical drive configured to read information from an optical medium;
   an operating system layer having an operating system operable to support execution of applications on the hardware layer;
   an application layer having an optical drive code manager configured to run on the CPU of the hardware layer, the optical drive code manager configured to apply one or more unique identifiers associated with the information handling system to generate a certificate associated with an optical drive code, the certificate defining a number of changes to the code permitted by the optical drive;
   wherein the optical drive code manager is further configured to encrypt the certificate after each code change and to decrypt the certificate to support each code change.

2. The information handling system of claim 1 wherein the optical drive code comprises a region code defining one or more regions associated with optical media that the optical drive is permitted to read.

3. The information handling system of claim 2 wherein the number of changes to the code permitted by the optical drive comprises five changes minus the number of changes already performed by the optical drive.

4. The information handling system of claim 1 wherein the optical drive code manager is further configured to refuse a code change if the defined number of code changes have occurred.

5. The information handling system of claim 1 wherein the unique identifiers comprise a unique identifier associated with the hardware layer, a unique identifier associated with the operating system layer, and the number of code changes permitted for the optical drive code.

6. The information handling system of claim 5 wherein the optical drive code manager is further configured to verify a certificate by extracting the unique identifiers from the certificate and comparing the extracted unique identifiers with the unique identifiers read from the hardware layer and the operating system layer.

7. The information handling system of claim 1 wherein the optical drive code manager is further configured to store the certificate as a hidden file in read only memory.

8. A method for managing code changes for an optical drive integrated in an information handling system, the method comprising:
   detecting an optical drive code change request;
   retrieving from memory a certificate associated with the code change request;
   verifying that the certificate incorporates one or more predetermined unique identifiers associated with the information handling system;
   determining from the certificate that the requested optical drive code change is authorized;
   changing the optical drive code in memory of the information handling system; and
   decrementing an allowed number of optical drive code changes associated with the certificate;
   encrypting the certificate with the decremented number of optical drive changes; and
   storing the encrypted certificate in a hidden file on the information handling system.

9. The method of claim 8 further comprising:
   determining from the certificate that the requested optical drive code change is unauthorized; and
   rejecting the optical drive code change.

10. The method of claim 8 wherein the optical drive code comprises a region code.

11. The method of claim 8 wherein detecting an optical drive code change comprises:
    reading a region code from an optical medium;

comparing the region code read from the optical medium with a current region code of the optical drive; and determining that the optical medium region code is incompatible with the optical drive current region code.

12. The method of claim 8 wherein retrieving a certificate further comprises:

detecting that no certificate is available;

retrieving the one or more predetermined unique identifiers; and generating the certificate from the predetermined unique identifiers, the certificate defining the a predetermined number of authorized optical drive code changes.

13. The method of claim 12 wherein the unique identifiers comprise a hardware unique identifier associated with a hardware component of the information handling system and an operating system unique identifier associated with an operating system of the information handling system.

14. The method of claim 12 further comprising:

encrypting the certificate; and storing the certificate on the information handling system.

15. A method for managing code changes for an optical drive integrated in an information handling system, the method comprising:

detecting an optical drive code change request;

retrieving from memory a certificate associated with the code change request;

verifying that the certificate incorporates one or more predetermined unique identifiers associated with the information handling system;

determining from the certificate that the requested optical drive code change is authorized;

changing the optical drive code in memory of the information handling system;

detecting that no certificate is available;

retrieving the one or more predetermined unique identifiers;

generating the certificate from the predetermined unique identifiers, the certificate defining the a predetermined number of authorized optical drive code changes;

encrypting the certificate; and storing the certificate on the information handling system.

* * * * *